March 10, 1931. J. DYKSTRA 1,795,938
FRAME CONSTRUCTION
Filed April 7, 1928 2 Sheets-Sheet 1
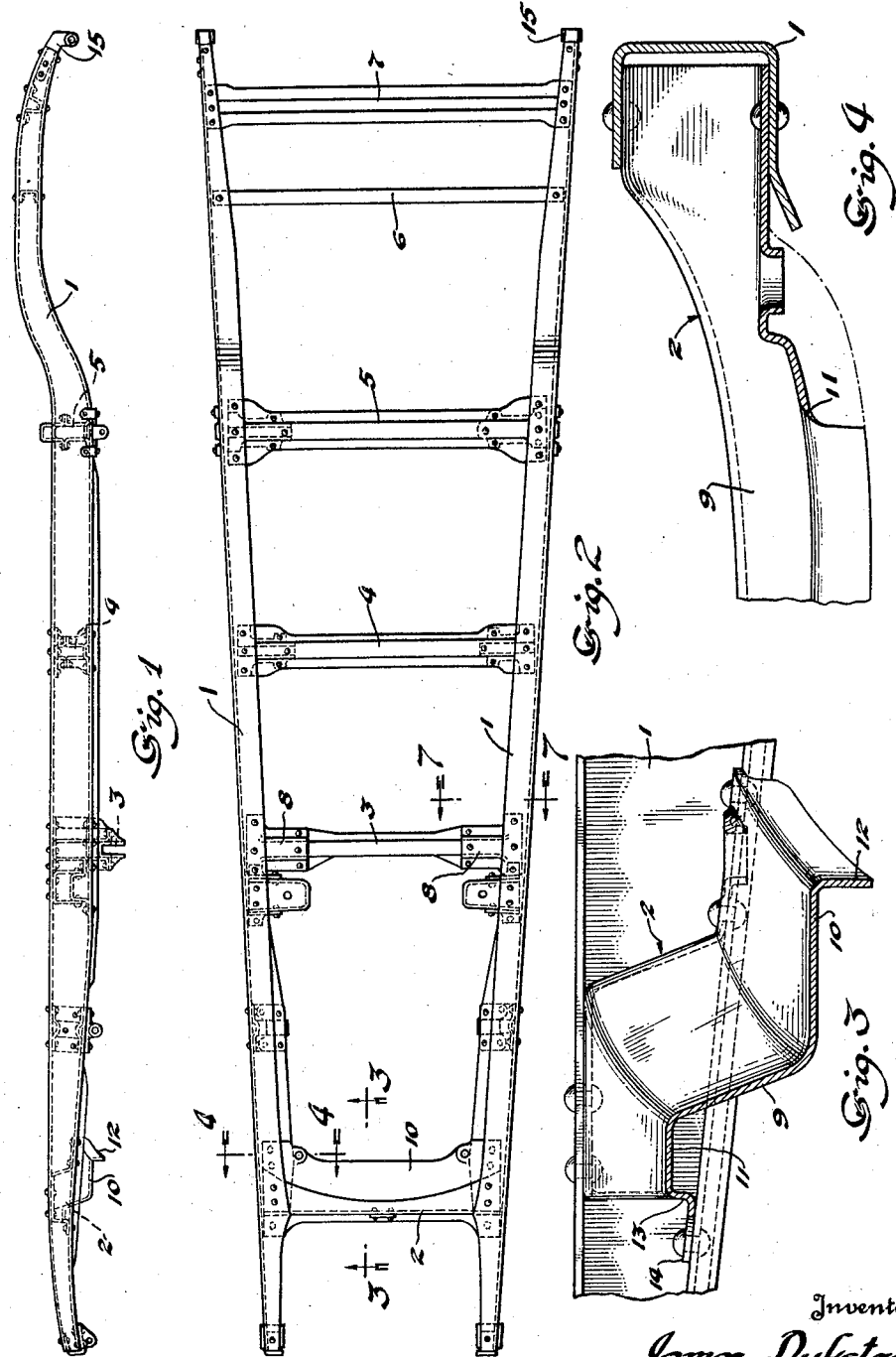

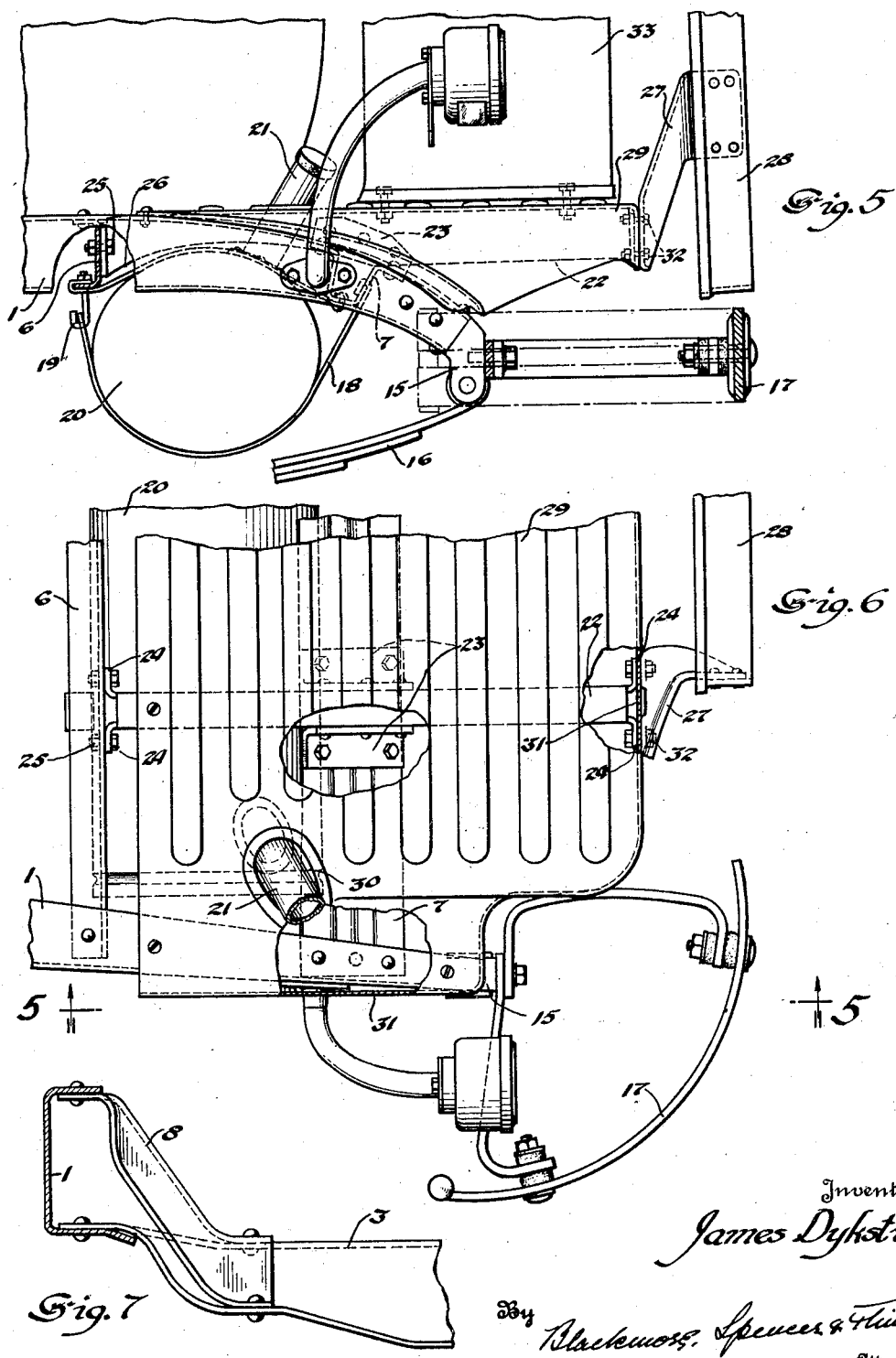

Patented Mar. 10, 1931

1,795,938

UNITED STATES PATENT OFFICE

JAMES DYKSTRA, OF LANSING, MICHIGAN, ASSIGNOR TO GENERAL MOTORS CORPORATION, OF DETROIT, MICHIGAN, A CORPORATION OF DELAWARE

FRAME CONSTRUCTION

Application filed April 7, 1928. Serial No. 268,190.

This invention relates to motor vehicles and more particularly to improvements in chassis frame construction.

One of the objects of the invention is to provide a cross member for the front of the chassis frame upon which the radiator and front of the engine may be mounted, and which may be readily pressed or stamped from sheet metal into a shape that will afford an exceptional degree of stiffness or resistance to distortion.

A further object of the invention is to provide an improved luggage platform and tire carrier construction, and a rugged mounting therefor at the rear of the vehicle.

Other objects and advantages will be apparent from the following specification taken in connection with the accompanying drawing, wherein Fig. 1 is a side elevation of a chassis frame construction;

Fig. 2 is a top plan view of a chassis frame;

Fig. 3 is a section on line 3—3 of Fig. 2;

Fig. 4 is a section on line 4—4 of Fig. 2;

Fig. 5 is a side elevation of the rear end of the chassis looking in the direction of the arrows on line 5—5 of Fig. 6;

Fig. 6 is a top plan view of substantially half of the rear portion of the chassis frame; and Fig. 7 is a section taken on line 7—7 of Fig. 2.

Referring to the accompanying drawings, the reference characters 1—1 indicate a pair of longitudinally extending channel-shaped chassis frame members which are connected with each other by a series of cross members 2, 3, 4, 5, 6 and 7 at spaced intervals. The cross members 3, 4 and 5 are substantially alike and each is in the form of a downwardly open channel with marginal reinforcement flanges, the opposite ends of the member being riveted or otherwise secured to the bottom flanges of the respective side members. There is also provided a similarly shaped brace member 8 secured at its opposite ends to the cross member and to the top flange of the longitudinal member respectively. The transverse member 2 at the front of the chassis frame is of a relatively wide Z-shape and is dropped throughout the medial portion of its extent, as is shown particularly in Fig. 4. The vertical connecting web 9 is curved forwardly toward the center line of the frame, and the ends of the lowermost leg 10 of the Z-shaped member are secured as by riveting or bolting to the bottom flanges of the side members, while the upper leg 11 is secured at each end to the top flanges of the side frame members. Both legs 10 and 11 are provided with angular reinforcement flanges 12 and 13 respectively, the flange 13 having an angular ear 14 at either end which is riveted or otherwise secured to the bottom flange of the adjacent frame member. The opposite ends of the leg portion 10 are provided with a flat shelf-like portion having a flanged opening for the mounting thereon of the front portion of the power plant or engine, the radiator for which engine may be carried upon the upper leg 11.

Secured in the down-turned horn of each frame member at the rear thereof is a bracket or fitting 15 having a pair of dependent ears, between which is pivotally mounted the terminal eye in the end of the load supporting spring 16. The bracket may also be used as a mounting or support for the fender guard or buffer 17. Suspended between the transverse members 6 and 7 by means of a strap 18 having an adjustable hook bolt 19, is a fuel tank 20 having an upwardly extending filling spout 21. A pair of supporting bars 22 of channel-shape are supported at an intermediate point by means of angle brackets 23 upon the frame member 7, and at both ends have a pair of angularly extending ears 24, comprising the side portions of the channel-shaped support, which extend beyond the connecting cross web thereof. The ears at one end of the supporting bars are secured by bolts 25 to the vertical web at the cross member 6, and that portion of each bar overlying the gas tank is arched as at 26, while the ears at the opposite end serve to mount brackets 27, carrying an annular ring 28 upon which may be mounted a spare tire. A load supporting platform 29, preferably formed from sheet metal and corrugated or ribbed for stiffening purposes, rests upon and extends across the pair of supporting bars and has an opening 30 for the projection therethru of the fuel tank filler spout 21 and is also provided with a dependent marginal flange 31, secured by bolts 32 between the tire carrier brackets 27 and terminal ears 24. The platform may be utilized for carrying luggage and for this purpose there is shown a trunk or container 33 mounted thereon. The rearmost corners of the platform are cut away and the remaining end portions thereof extend over and cover the tops of the side frame members 1, presenting a finished and pleasing appearance for the rear end assembly.

I claim:

1. A chassis frame including, in combination, a pair of channel-shaped side members and a series of transverse members connecting said side members, one of the transverse members being of substantially Z-shape in cross section, and dropped thruout its intermediate portion, the vertical connecting web thereof being in a plane curved forwardly from opposite ends toward the center, means to connect the ends of the leg portions of Z-shaped cross member to the top and bottom flanges respectively of the side members, one of said legs being provided adjacent its opposite ends with portions forming a part of an engine mounting.

2. A chassis frame member including, in combination, a pair of side members and a series of transverse members, one of which is of substantially Z-shape in cross section and dropped thruout its intermediate extent, with its vertical web lying in a plane forwardly curved toward the center-line of the frame, one of the legs of the Z-shaped member having portions adjacent its opposite ends which are adapted to support an engine or the like.

3. A chassis frame member pressed from sheet metal into a relatively wide Z-shape in cross section, and which is centrally dropped, the connecting web thereof lying in a forwardly curved plane, and the leg portions thereof having lateral reinforcement flanges.

4. A chassis frame member pressed from sheet metal into a relatively wide Z-shape in cross section, and which is centrally dropped, the connecting web thereof lying in a plane curved forwardly, and the leg portions thereof having lateral reinforcement flanges, one of said flanges having an angular attachment ear and the other leg having a shelf-like portion for mounting an engine thereon.

5. A chassis frame including, in combination, a pair of channelled members, and a connecting member pressed from sheet metal to a relatively wide Z-shape in cross section, the upper and lower legs of which are adapted for attachment with the top and bottom flanges respectively of said channelled members, both of said legs having marginal reinforcement flanges, the flange of the upper leg being provided with angular ears for attachment with the bottom flanges of the channelled members, and portions adjacent the opposite ends of the lower leg adapted for the mounting thereon of an engine or the like.

In testimony whereof I affix my signature.

JAMES DYKSTRA.